United States Patent [19]

Benguerel et al.

[11] 4,081,438
[45] Mar. 18, 1978

[54] ANIONIC AZO DYES HAVING A 3-DIBENZOFURANYL DIAZO COMPONENT RADICAL OPTIONALLY HAVING A 2-OR 8-SULFO GROUP

[75] Inventors: François Benguerel, Binningen; Jean-Jacques Salzmann, Aesch, both of Switzerland

[73] Assignee: Sandoz Ltd., Basel, Switzerland

[21] Appl. No.: 572,765

[22] Filed: Apr. 29, 1975

[30] Foreign Application Priority Data

May 4, 1974 Switzerland ............... 6050/74

[51] Int. Cl.$^2$ ............................................. C09B 31/14
[52] U.S. Cl. ................................... 260/160; 260/152; 260/155; 260/156; 260/162; 260/164; 260/165
[58] Field of Search .................. 260/162, 161, 160

[56] References Cited

U.S. PATENT DOCUMENTS

| 2,128,508 | 9/1938 | Stosser et al. | 260/160 X |
| 3,514,439 | 5/1970 | Wehrli et al. | 260/162 X |
| 3,565,884 | 2/1971 | Haag et al. | 260/162 |
| 3,676,050 | 7/1972 | James | 260/184 X |

FOREIGN PATENT DOCUMENTS 955,085  4/1964  United Kingdom ............... 260/163

OTHER PUBLICATIONS

Venkataraman, *The Chemistry of Synthetic Dyes*, vol. I, Academic Press Inc., New York, 1952, p. 270.

*Primary Examiner*—Charles F. Warren

*Attorney, Agent, or Firm*—Gerald D. Sharkin; Richard E. Vila; Melvin M. Kassenoff

[57] ABSTRACT

Disclosed are azo dyes containing a diazo component radical of the formula

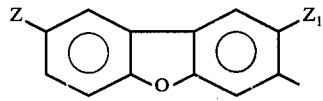

wherein each of
Z and $Z_1$ is independently hydrogen or sulfo, with the proviso that at least one of Z and $Z_1$ is hydrogen, for example monoazo and disazo dyes of the formula

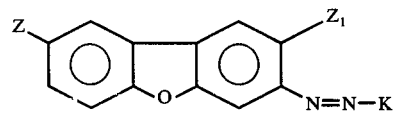

and salts thereof,
wherein
K is a coupling component radical of the aromatic carbocyclic, active methylene group-containing aliphatic or aromatic heterocyclic series, and
Z and $Z_1$ are as defined above, with the proviso that the dyes contain one or two sulfo groups, and the use thereof for the dyeing and printing of anionic dyeable substrates, particularly polyamide substrates.

13 Claims, No Drawings

ANIONIC AZO DYES HAVING A 3-DIBENZOFURANYL DIAZO COMPONENT RADICAL OPTIONALLY HAVING A 2-OR 8-SULFO GROUP

The invention relates to sulfo group containing azo compounds.

The invention provides azo dyestuffs containing, as radical derived from a diazo component, a 3-dibenzofuranyl radical, which radical is unsubstituted or substituted in only one of the 2- and 8 positions thereof by a sulpho group, such compounds containing 1 or 2 sulpho groups.

The compounds of the invention may be mono- or polyazo, preferably mono- or disazo. They are preferably free from fibre-reactive groups.

In the compounds of the invention, the radical derived from the coupling component may be any conventional in the azo dyestuff art. For example it may be a radical derived from a coupling component of the aromatic carbocyclic type, e.g. of the aminobenzene, hydroxybenzene, aminonaphthalene and hydroxynaphthalene series, of the aromatic heterocyclic type, e.g. of the pyrazolone, aminopyrazole, indole or carbazole series such as 1-phenyl- or 1-naphythlpyrazolone-5, 1-phenyl- or 1-naphthyl-5-aminopyrazole or indole series or of the active methylene group-containing aliphatic type, e.g. of the N-alkyl or N-arylacetoacetamide series, particularly the latter.

Of the monoazo dyes provided by the invention, those containing, as the radical derived from the coupling component, a radical of one of the formulae (a) to (i') are preferred:

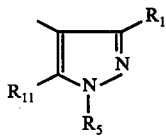
(a)

in which $R_1$ is hydrogen, $C_{1-4}$alkyl (preferably methyl), phenyl or —CO—$R_2$; preferably $C_{1-4}$alkyl, more preferably methyl, where $R_2$ is —OH, —OR$_3$ or —NH—R$_4$, where $R_3$ is $C_{1-4}$alkyl, and $R_4$ is hydrogen, $C_{1-4}$alkyl or phenyl, $R_{11}$ is —OH or —NHR$_{12}$, where $R_{12}$ is hydrogen or —SO$_2$R$_{13}$; preferably hydrogen, $R_{13}$ is $C_{1-4}$alkyl, phenyl or phenyl substituted by 1 to 3 $C_{1-4}$alkyls, and $R_5$ is hydrogen or one of the radicals of formulae (i) to (iv)

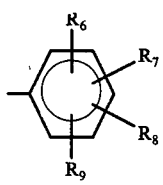
(i)

where $R_6$ is hydrogen, halogen (preferably chlorine), $C_{1-4}$alkyl (preferably methyl), $C_{1-4}$alkoxy (preferably methoxy), —CN, —CF$_3$, —OH or —SO$_2$NR$_{10}$R$_{10}'$; preferably hydrogen, chlorine, methyl, methoxy, —CN, —CF$_3$ or —SO$_2$NR$_{10}$R$_{10}'$; more preferably hydrogen, chlorine, methyl or methoxy; most preferably hydrogen or chlorine;

$R_{10}$ is hydrogen, $C_{1-4}$alkyl, $C_{1-4}$ (preferably $C_2$) hydroxyalkyl or phenyl; preferably hydrogen or 2-hydroxyethyl, and $R_{10}'$ is hydrogen or $C_{1-4}$alkyl; preferably hydrogen, $R_7$ is hydrogen, halogen (preferably chlorine), $C_{1-4}$alkyl (preferably methyl), $C_{1-4}$alkoxy (preferably methoxy), sulpho or carboxyl; preferably hydrogen, chlorine, methyl, methoxy or sulpho; more preferably hydrogen, chlorine or sulpho, and most preferably hydrogen or sulpho, $R_8$ is hydrogen, halogen (preferably chlorine) or $C_{1-4}$alkyl (preferably methyl); preferably hydrogen or chlorine, and more preferably hydrogen, $R_9$ is hydrogen or sulpho, preferably hydrogen:

where the phenyl group (i) is monosubstituted by sulpho, such sulpho preferably being in the 4-position and where monosubstituted by another substituent, e.g. chlorine, such preferably being in the 2- or 4-position, more preferably the latter:

where the phenyl group (i) is disubstituted, such substituents being preferably in the 2,4-, 3,4- or 2,5-positions, more preferably the latter; any disubstituted phenyl group (i) preferably being a 2-chloro-5-sulphophenyl:

where the phenyl group (i) is trisubstituted such substituents being preferably in the 2,3,4-, 2,3,5-, 2,4,5- or 2,4,6-, positions, one of the substituents preferably being sulpho in the 4- or 5-position; any trisubstituted phenyl group (i) preferably being 2,5-dichloro-4-sulfophenyl the most preferred phenyl group (i) being unsubstituted:

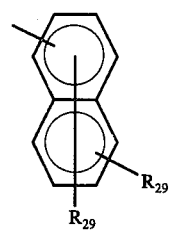
(ii)

where the $R_{29}$'s, independently, are hydrogen or sulpho, at least one preferably being sulpho:

where radical (ii) is a 1-naphthyl group, such preferably being substituted by two sulpho groups in positions 2,5, 2,8, or 2,6, particularly the latter:

where radical (ii) is a 2-naphthyl group monosubstituted by sulpho, such sulpho preferably being in the 6-position and, where radical (ii) is a 2-naphthyl group substituted by two sulpho groups, such groups preferably being in positions 4,8, 6,8 or 1,5, particularly the latter:

the preferred radicals (ii) being 6-sulphonaphthyl-2 and 1,5-disulfonaphthyl-2:

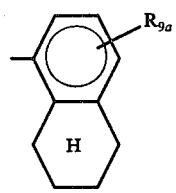 (iii)

where
R$_{9a}$ is hydrogen or sulpho, preferably sulpho in position 4,

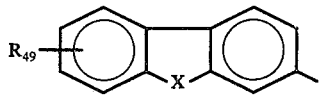 (iv)

where
R$_{49}$ is hydrogen or sulpho, and X is —CH$_2$— or —O—,

 (b)

CH$_3$—CO—CH—CO—NH—R$_{14}$ where
R$_{14}$ is C$_{1-12}$alkyl, unsubstituted or monosubstituted by halogen, hydroxy, phenyl, sulphophenyl or naphthyl; cyclohexyl; cyclohexyl substituted by up to 3 C$_{1-4}$alkyls; or, preferably, a radical of formula (v) or (vi),

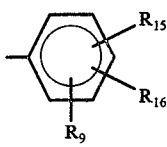 (v)

in which
R$_9$ is as defined above, preferably hydrogen,
R$_{15}$ is hydrogen, halogen (preferably chlorine), sulpho, C$_{1-4}$ (preferably C$_{1-2}$) alkyl or alkoxy or —CF$_3$; preferably hydrogen, chlorine, C$_{1-2}$-alkyl or alkoxy or sulpho, more preferably hydrogen, methyl, C$_{1-2}$-alkoxy or sulpho,
R$_{16}$ is hydrogen, halogen (preferably chlorine), C$_{1-4}$ (preferably C$_{1-2}$) alkyl or alkoxy or phenoxy, preferably hydrogen, chlorine or C$_{1-2}$alkyl or alkoxy, more preferably hydrogen, methyl or methoxy;
where the phenyl group (v) is monosubstituted, such substituent being preferably in position 2, except when sulpho where such is preferably in position 4,
where the phenyl group (v) is disubstituted, such substituents preferably being in positions 2,5,

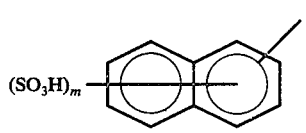 (vi)

wherein
m is 0, 1 or 2, preferably 1 or 2:
where radical (vi) is a 1-naphthyl monosubstituted by sulpho, such sulpho being, for example, in position 4, 5, 6 or 7, preferably in position 4, 6 or 7, and where disubstituted by sulpho, such preferably being in positions 3,6 or 4,6:
where radical (vi) is a 2-naphthyl monosubstituted by sulpho, such sulpho being, for example, in position 1, 5 or 6, preferably in position 1 or 5, and where disubstituted by sulpho, such preferably being in positions 4,8, or 5,7,

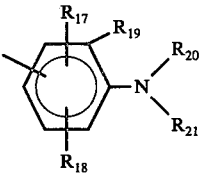 (c)

wherein
R$_{17}$ is hydrogen, halogen (preferably chlorine), C$_{1-4}$alkyl (preferably methyl) or C$_{1-4}$ (preferably C$_{1-2}$)alkoxy; preferably hydrogen, chlorine, methyl, methoxy or ethoxy; more preferably hydrogen, methyl or methoxy,
R$_{18}$ is hydrogen, C$_{1-4}$alkyl (preferably methyl), C$_{1-4}$ (preferably C$_{1-2}$)alkoxy, —NH—CONHR$_{22}$ or —NH—CO—R$_{22}$', preferably hydrogen, methyl, methoxy or ethoxy, more preferably methyl or methoxy,
R$_{22}$ is hydrogen, C$_{1-4}$alkyl or phenyl,
R$_{22}$' is C$_{1-4}$alkyl or phenyl,
either
R$_{19}$ is hydrogen
and
R$_{20}$ is hydrogen; unsubstituted C$_{1-4}$alkyl; C$_{1-4}$-alkyl mono-substituted by halogen, phenyl, —CN or —OH (preferably —C$_2$H$_4$Cl, —C$_2$H$_4$CN, —C$_2$H$_4$OH or benzyl); benzyl substituted by a sulpho group; or phenyl; preferably hydrogen, methyl, ethyl, propyl, butyl, —C$_2$H$_4$Cl, —C$_2$H$_4$CN, —C$_2$H$_4$OH, benzyl, monosulfonbenzyl or phenyl, more preferably hydrogen, methyl, ethyl, —C$_2$H$_4$CN or —C$_2$H$_4$OH,
or
R$_{19}$ and R$_{20}$, together form an ethylene or 1,3-propylene radical,
and
R$_{21}$ is hydrogen, unsubstituted C$_{1-4}$alkyl or C$_{1-4}$alkyl monosubstituted by halogen, phenyl, —CN or —OH (preferably —C$_2$H$_4$Cl, —C$_2$H$_4$CN or C$_2$H$_4$OH); preferably hydrogen, methyl, ethyl, propyl, butyl, —C$_2$H$_4$Cl, —C$_2$H$_4$CN or —C$_2$H$_4$OH, more preferably hydrogen, methyl, ethyl, —C$_2$H$_4$CN or —C$_2$H$_4$OH,
or
R$_{20}$ and R$_{21}$, together with the nitrogen atom, form a saturated 5 or 6 membered heterocyclic ring, e.g. morpholine, piperidine or pyrrolidine, the free bond in the radical (c) preferably being in p-position to the amino group;

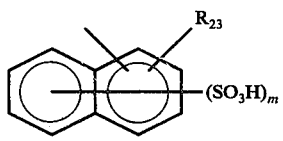 (d)

where m is as defined above,
R$_{23}$ is —OH or —NH—R$_{24}$, $R_{24}$ is $C_{1-4}$alkyl; unsubstituted cyclohexyl; cyclohexyl substituted by up to 3
$C_{1-4}$alkyls; or, preferably, hydrogen or a radical of formula (vii)

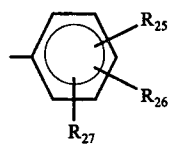

where
$R_{25}$ is hydrogen, $C_{1-4}$alkyl (preferably methyl), $C_{1-4}$ (preferably $C_{1-2}$)alkoxy, halogen (preferably chlorine), —$CF_3$ or sulpho, preferably hydrogen, chlorine, methyl, methoxy, ethoxy or sulpho, $R_{26}$ is hydrogen, $C_{1-4}$alkyl (preferably methyl) or $C_{1-4}$ (preferably $C_{1-2}$)alkoxy, preferably hydrogen, methyl, methoxy or ethoxy, $R_{27}$ is hydrogen or $C_{1-4}$alkyl, preferably hydrogen or methyl, where, in the radical of formula (d), $R_{23}$ is in the 1-position, any single sulpho group is preferably in position 3,4 or 5, and any two sulpho groups are preferably in the three-sixths or three-eights positions:

where, in the radical of formula (d), $R_{23}$ is in the 2-position, any single sulpho is preferably in position 4, 6 or 8, particularly the latter, and any two sulpho groups are preferably in positions 3,6 or 6,8,

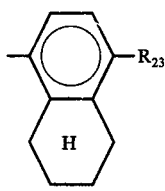

in which $R_{23}$ is as defined above,

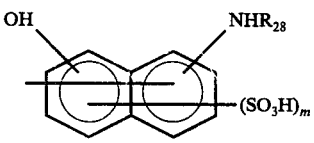

in which $m$ is as defined above, and
$R_{28}$ is —$SO_2$—$R_{29}$, (where $R_{29}$ is $C_{1-12}$alkyl); unsubstituted cyclohexyl; cyclohexyl substituted by up to 3 $C_{1-4}$alkyls; or, preferably, hydrogen; $C_{1-4}$ (preferably straight chain) alkyl (preferably methyl); or a radical of formula (viii), (ix), (x), (xi) or (xii),

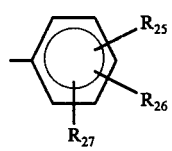

in which
$R_{25}$, $R_{26}$ and $R_{27}$ and the preferred significances thereof are as defined above,

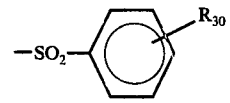

where
$R_{30}$ is hydrogen or $C_{1-4}$alkyl; preferably hydrogen or methyl,

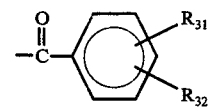

where
$R_{31}$ is hydrogen, nitro, $C_{1-4}$alkyl or alkoxy (preferably methyl or methoxy) or —$NHR_{34}$; preferably hydrogen, methyl or methoxy,
$R_{34}$ is hydrogen or $C_{1-4}$alkyl,
$R_{32}$ is hydrogen or $C_{1-4}$alkyl; preferably hydrogen or methyl, —OC—$R_{33}$ (xi)

where $R_{33}$ is $C_{1-12}$alkyl; preferably $C_{1-4}$alkyl; more preferably methyl or ethyl, —O—CO—$R_{33}'$ (xii)

where
$R_{33}'$ is $C_{1-18}$alkyl, phenyl, unsubstituted cyclohexyl or cyclohexyl substituted by up to 3 $C_{1-4}$alkyls; preferably phenyl, in the radical (f) $m$ preferably being 1 or 2, the preferred positioning of substituents and the free bond (coupling position) being according to the following table

| —NH—$R_{28}$ | OH | sulpho(s) | free bond |
|---|---|---|---|
| 2 | 8 | 6 | 1 |
| 8 | 1 | 3,5, 3,6 or 5,7 | 2 |
| 5 | 1 | 3 | 2 |
| 6 | 1 | 3 | 2 |
| 7 | 1 | 3,4, 3,6 or 5,6 | 2 | the positioning as shown the first two rows of the table being particularly preferred;

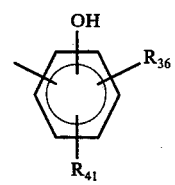

in which
$R_{36}$ is hydrogen, hydroxy, $C_{1-8}$ (preferably $C_{1-4}$) alkyl (preferably methyl, ethyl or tert.- butyl), $C_{1-4}$ (preferably $C_{1-2}$)alkoxy, —$NH_2$, —COOH, —$COOR_3$, —$CONH_2$, —$CONHR_{38}$ or —NH—CO—$R_{38}$, preferably methyl, ethyl, tert.- butyl, methoxy or ethoxy,
$R_3$ is as defined above,
$R_{38}$ is $C_{1-4}$alkyl or a radical (xiii)

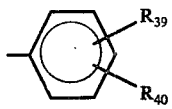
(xiii)

$R_{39}$ is hydrogen, halogen, (preferably chlorine), $C_{1-4}$alkyl or alkoxy, —$CF_3$ or sulpho,
$R_{40}$ is hydrogen, $C_{1-4}$alkyl or sulpho,
either
$R_{41}$ is hydrogen or $C_{1-4}$alkyl,
or, where
$R_{36}$ is other than hydrogen, $R_{41}$ is a radical —CH=CH—$CR_9$=CH—, thus forming a naphthyl radical,
$R_9$ is as defined above,

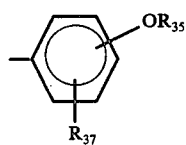
(h)

where
$R_{35}$ is $C_{1-4}$alkyl (preferably methyl, ethyl or propyl), —$SO_2R_{29}$ or a radical (ix) above, (preferably where $R_{30}$ is hydrogen or methyl); preferably methyl, ethyl or propyl or a radical (ix); more preferably methyl; the group —$OR_{35}$ preferably being para to the azo linkage,
$R_{37}$ is hydrogen or $C_{1-4}$ (preferably $C_{1-2}$)alkyl or alkoxy, preferably hydrogen, methyl, ethyl, methoxy or ethoxy,

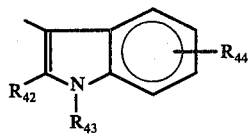
(i')

where
$R_{42}$ is $C_{1-4}$alkyl, phenyl or benzyl; preferably phenyl,
$R_{43}$ is hydrogen, $C_{1-4}$alkyl or benzyl; preferably hydrogen, and
$R_{44}$ is hydrogen, halogen, sulpho or $C_{1-4}$alkyl or alkoxy; preferably hydrogen.

Of the disazo dyes provided by the invention, those having as the radical bound to the azo group in the 3-position of the dibenzofuranyl radical a radical of formula (j) are preferred, —Y—N=N—$K_1$ (j)

in which Y is a radical of formula (xv), (xvi), (xvii) or (xviii); preferably of formula (xv) or (xvi),

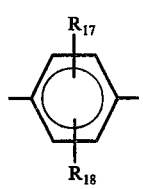
(xv)

where $R_{17}$ and $R_{18}$ and the preferred significances thereof are as defined above,

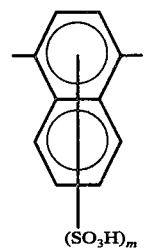
(xvi)

where
$m$ is as defined above,

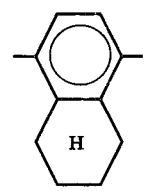
(xvii)

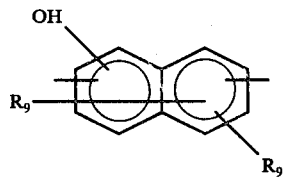
(xviii)

where the $R_9$'s and the preferred significances thereof, independently, are as defined above, and $K_1$ is the radical of a coupling component of formula (a) (b), (c), (d), (e), (f), (g), (h) or (i'), preferably such radicals having preferred substituents as above: where the radical (xv) is a monosubstituted 1,4-phenylene, the substituent preferably being in meta-position to the group —N=N—$K_1$:

where the radical (xv) is disubstituted 1,4-phenylene, the two substituents preferably being in para-position relative to each other:

where, in the radical (xvi), $m$ is 1, the sulpho group cannot, of course, be in the 3- or 5 position relative to the —N=N—$K_1$ group, preferred radicals of formula (xvi) being unsubstituted or monosubstituted by sulpho, the sulpho being in the 6-, 7- or 8-position relative to the —N=N—$K_1$ group.

Particularly preferred compounds of the invention are the compounds which contain one or two sulpho groups and which are of the formula

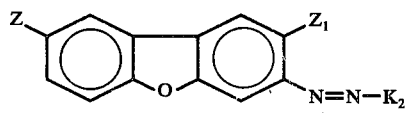

where each of
Z and $Z_1$, independently, signifies hydrogen or sulpho, with the proviso that both do not simultaneously signify sulpho,
$K_2$ is a radical of formula (aa), (ab), (ba), (ca), (da), (db), (fa), (ga), (gb), (ha) or (ja),

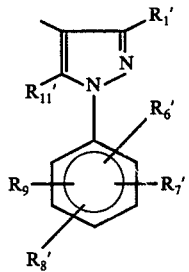
(aa)

where
R$_1'$ is C$_{1-4}$alkyl; preferably methyl,
R$_{11}'$ is —OH or —NH$_2$,
R$_9$ and the preferred significance thereof is as defined above,
R$_6'$ is hydrogen, chlorine, methyl, methoxy, —CN or —SO$_2$NR$_{10}$R$_{10}'$ (where R$_{10}$ and R$_{10}'$ and the preferred significances thereof are as defined above); preferably hydrogen, chlorine, methyl or methoxy; more preferably hydrogen or chlorine,
R$_7'$ is hydrogen, chlorine, methyl, methoxy or sulpho; preferably hydrogen, chlorine or sulpho; more preferably hydrogen or sulpho,
R$_8'$ is hydrogen, chlorine or methyl; preferably hydrogen or chlorine; more preferably hydrogen, and the preferred positioning of substituents is as defined above for formula (a),

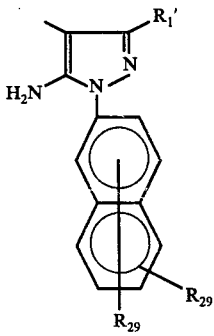
(ab)

in which R$_1'$ and the R$_{29}$'s are as defined above, and the preferred positions of substitution are as defined above, for formula (a);

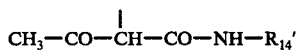
(ba)

where
R$_{14}'$ is a radical of formula (vi), above, or a radical of formula (v')

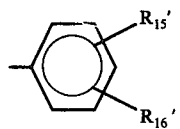
(v')

where R$_{15}'$ is hydrogen, chlorine, C$_{1-2}$alkyl or alkoxy or sulpho; preferably hydrogen, methyl, C$_{1-2}$ alkoxy or sulpho, and
R$_{16}'$ is hydrogen, chlorine or C$_{1-2}$alkyl or alkoxy; preferably hydrogen, methyl or methoxy, the preferred positions of substitution in radical (v') being as given above for radical (v);

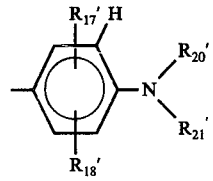
(ca)

where R$_{17}'$ is hydrogen, chlorine, methyl, methoxy or ethoxy; preferably hydrogen, methyl or methoxy,
R$_{18}'$ is hydrogen, methyl, methoxy or ethoxy; preferably methyl or methoxy,
R$_{20}'$ is hydrogen, methyl, ethyl, propyl, butyl, —C$_2$H$_4$Cl, —C$_2$H$_4$CN, —C$_2$H$_4$OH, benzyl, monosulphobenzyl or phenyl; preferably hydrogen, methyl, ethyl, —C$_2$H$_4$CN or —C$_2$H$_4$OH,
R$_{21}'$ is hydrogen, methyl, ethyl, propyl, butyl, —C$_2$H$_4$Cl, —C$_2$H$_4$CN or —C$_2$H$_4$OH, preferably hydrogen, methyl, ethyl, —C$_2$H$_4$CN or —C$_2$H$_4$OH,
the substituents R$_{17}'$ and R$_{18}'$, where both are other than hydrogen, preferably being in para position relative to each other,

(da)

where $m$ is as defined above,

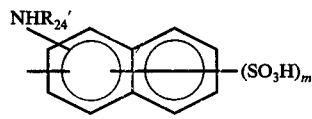
(db)

where R$_{24}'$ is hydrogen or a radical (vii')

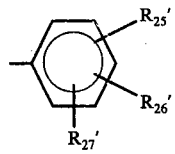
(vii')

where
R$_{25}'$ is hydrogen, chlorine, methyl, methoxy, ethoxy or sulpho,
R$_{26}'$ is hydrogen, methyl, methoxy or ethoxy, and
R$_{27}'$ is hydrogen or methyl,
the preferred positioning of any sulpho groups in radicals (da) and (db) being as given above for radical (d),

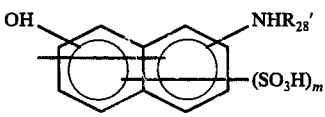
(fa)

where $m$ is as defined above, and
R$_{28}'$ is hydrogen, methyl, ethyl, n-propyl, n-butyl, —CO—CH$_3$, —CO—C$_2$H$_5$ or —O—CO—C$_6$H$_5$ or a radical (viii'), (ix') or (x')

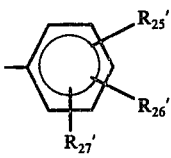 (viii')

where
$R_{25}'$, $R_{26}'$ and $R_{27}'$ are as defined above,

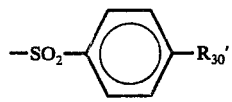 (ix')

where
$R_{30}'$ is hydrogen or methyl,

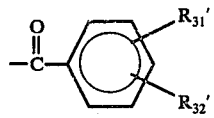 (x')

where
$R_{31}'$ is hydrogen, methyl or methoxy, and
$R_{32}'$ is hydrogen or methyl,
the preferred positioning of substituents and the free bond in formula (fa) being as given above for formula (f),

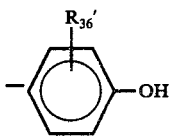 (ga)

$R_{36}'$ is methyl, ethyl, tert.butyl, methoxy or ethoxy;

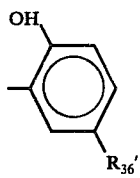 (gb)

where
where $R_{36}'$ as defined above, of the radicals (ga) and (gb), (gb) being preferred;

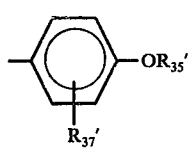 (ha)

where
$R_{35}'$ is methyl, ethyl, propyl,

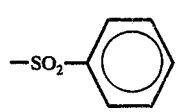

or

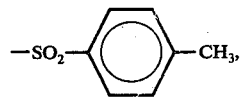 (viii')

$R_{37}'$ is hydrogen, methyl, ethyl, methoxy or ethoxy;

$-Y'-N=N-K_1'$ (ja)

where
Y' is a radical (xv') or (xvi')

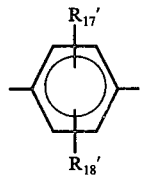 (xv')

where
$R_{17}'$ and $R_{18}'$ are as defined above and the preferred positioning thereof is as given for formula (xv), (xvi')

where
$R_9$ is as defined above, and
$K_1'$ signifies a radical of formula (aa), (ab), (ba), (ca), (da), (db), (fa), (ga), (gb) or (ha).

Of the above preferred class of dyes, those monoazo dyes in which $K_2$ is a radical of formula (aa), (ab), (ba), (ca), (da) or (gd) are particularly preferred and those disazo dyes in which $K_1'$ is a radical of formula (ca), (da), (db), (fa) or (gb) are particularly preferred.

The compounds provided by the present invention may be obtained in conventional manner, for example the monoazo dyes may be obtained by coupling the diazo derivative of a 3-aminodibenzofuranyl unsubstituted or substituted in only one of positions 2 and 8 thereof by a sulpho group, with a coupling component, the coupling component being so chosen so that the final azo dyestuff contains one or two sulpho groups. By choosing a coupling component having a diazotisable amino group, the resulting compound may be diazotised and coupled with a further coupling component to produce a disazo dye, again the coupling components being chosen so that the final disazo dye contains 1 or 2 sulpho groups.

Such couplings may be carried out in conventional manner, e.g. in aqueous or aqueous/organic acid, neutral or alkaline medium at a temperature of from $-10°$ C to room temperature, optionally in the presence of a coupling accelerator, such as pyridine or urea.

As will be appreciated, where, in the final azo dye, in the radical derived from the coupling compound, it is desired to have an alkoxy or acyl group, and such group would hinder or prevent coupling taking place if it were present in the "coupling" component (e.g. in the radical of formula (h), above), such dyes are prepared by employing the corresponding hydroxy substituted coupling component, followed by etherification or acylation in conventional manner. Such etherification is conveniently carried out, e.g. with dialkyl sulphates, in aqueous media at a pH of from 8 to 10, at a temperature of from 30° to 80° C, preferably from 40° to 60° C in the presence of, for example, sodium or potassium carbonate or bicarbonate. The acylation is suitably carried out in aqueous media at a pH of from 8 to 10, preferably about 9 at a temperature of 30° to 80° C, preferably at about 50° C, the reaction advantageously being carried out in the presence of sodium carbonate or disodium phosphate. Inert solvents such as dichlorobenzene may also suitably be used.

The azo dyes according to the invention may be in free acid or salt forms. In such salt forms, the cations may be any conventional in the anionic dyestuff art, their exact nature, provided they are non-chromophoric, not being critical. Particularly suitable cations are the alkali metal cations, e.g. sodium and potassium and the ammonium, alkyl- and alkanolammonium cations, e.g. of the formula $N^{\oplus}RaRbRcRd$, where Ra, Rb, Rc and Rd, independently, signify hydrogen, $C_{1-3}$ alkyl or $C_{2-4}$ hydroxyalkyl (where the hydroxy is separated from the nitrogen by at least 2 carbon atoms) with the proviso that where any of Ra, Rb, Rc and Rd signify hydroxyalkyl, at least one signifies hydrogen. Examples of such cations include mono-, di-, tri- and tetra-methylammonium and mono-, di- and tri-isopropanolammonium cations. The preferred cation is the sodium cation.

The azo dyes of the invention may be used for the dyeing or printing of anionic dyeable substrates, e.g. natural and synthetic polyamides, such as wool, silk or nylon, cellulose fibres such as cotton or tannin-treated cotton, or of regenerated cellulose fibres and polypropylene fibres modified by basic groups. On the above-mentioned substrates the compounds have good fastness to light and good general fastness properties, e.g. wet fastness.

However, the dyes are preferably used for the dyeing or printing of polyamides, particularly nylon.

The dyes according to the invention are surprisingly found to have the combination of good neutral affinity and notable migration. These two properties are not usually found in combination in dyes of the present type. The dyes go no neutral and at the same time act as levelling dyes, a particularly sought-after combination of qualities.

In the following Examples the parts and percentages are by weight and the temperatures are in degrees centigrade.

EXAMPLE 1

18.3 Parts of 3-aminodibenzofuran are suspended at 0°–5° in a mixture consisting of 150 parts water and 20 parts of a 30% hydrochloric acid. A solution of 7 parts sodium nitrite in 25 parts water is then added to the suspension dropwise during which time the temperature is kept at 0°–5°.

After 30 minutes the diazo solution is added dropwise to a solution consisding of 32.3 parts of 1-(2′,5′-dichlorophenyl)-3-methyl-5-pyrazolone-4′-sulphonic acid, 10 parts of sodium carbonate and 200 parts of water, and the coupling mass is stirred for 2 hours during which time the temperature may rise to room temperature.

The pH of the coupling mass is then set at 7 and the precipitated dye is filtered by suction, washed with an aqueous sodium chloride solution and dried at 80°. In the form of the free acid, the dye is of the formula

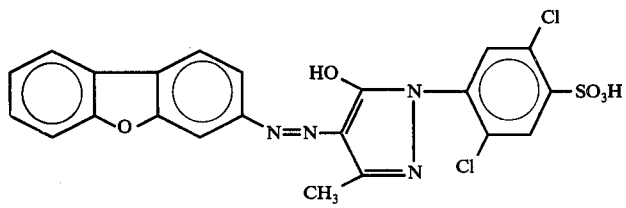

It dyes synthetic polyamide fibres a golden yellow shade.

EXAMPLE 2

23.9 Parts of 2-amino-8-hydroxynaphthalene-6-sulphonic acid are dissolved in 200 parts of water at a pH of 8 and 10 parts of hydrochloric acid are added to the solution. To the resultant suspension is added, dropwise, at a temperature of 0°–5° the diazo solution prepared as in Example 1. The pH is kept weakly congo acid by the addition of sodium acetate. After stirring for 2 hours, the precipitated dye is filtered off, washed with an aqueous sodium chloride solution and then dried at 80°. In the form of the free acid the dye has the formula

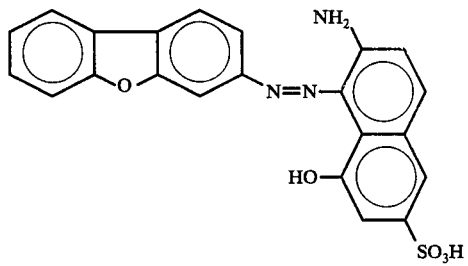

and it dyes synthetic polyamide bluish red shades.

EXAMPLE 3

28.5 Parts of the sodium salt of 3-aminodibenzofuran-8-sulphonic acid, obtained by reacting 3-aminobenzofuran hydrochloride with an excess of sulphuric acid monohydrate at room temperature, are suspended in 400 parts of water. The pH is adjusted to 8 with sodium carbonate. 7 Parts of sodium nitrite in 25 parts of water are then added. This suspension is added dropwise to a solution consisting of 20 parts 30% hydrochloric acid and 100 parts of water at 0°–5°. The diazo solution is stirred for 1 hour at a temperature of less than 10°.

This diazo solution is then added over the course of 30 minutes to a solution consisting of 20.9 parts of 1-(2′-chlorophenyl)-3-methyl-5-pyrazolone and 400 parts of water which has been adjusted to a pH of 9 with sodium carbonate. The pH of the coupling mass is kept at between 8.5 and 9 by adding, dropwise, a 20% sodium carbonate solution. After 2 hours the coupling mass is heated to 80° and dissolved by the addition of 200 parts of alcohol. The solution is filtered and sodium chloride is added, the salted out dye is filtered off, washed with a 20% sodium chloride solution and dried at 80°. In the form of the free acid, the dye has the formula

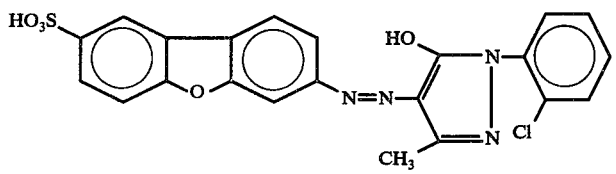

and it dyes synthetic polyamide golden yellow shades. The dyeings have good light and wet fastness properties.

EXAMPLE 4

A dye which, in the form of the free acid, has the formula

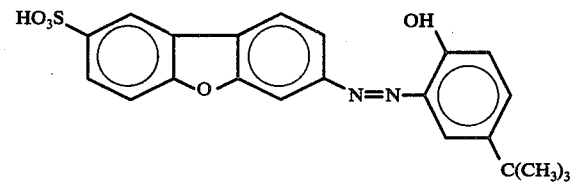

can also be produced as described in Example 3. It dyes synthetic polyamide a yellow shade.

EXAMPLE 5

28.5 Parts of the sodium salt of 3-aminodibenzofuran-2-sulphonic acid obtained by heating 3-aminodibenzofuran with conc. sulphuric acid (molar ratio 1:1, temperature approximately 200°) are suspended in 400 parts of water. The pH is adjusted to 8 with sodium carbonate and 7 parts of sodium nitrite in 25 parts of water are then added. This suspension is added dropwise, at 0°–5°, to a solution consisting of 20 parts of a 30% hydrochloric acid and 100 parts of water. The diazo solution is stirred for a further hour at a temperature of less than 10°.

This diazo solution is then added within 30 minutes to a solution consisting of 17.4 parts of 1-phenyl-3-methyl-5-pyrazolone and 400 parts of water, the pH of which has previously been adjusted to 9 with sodium carbonate. The process then continues as described in Example 3. In the form of the free acid, the dye obtained has the formula

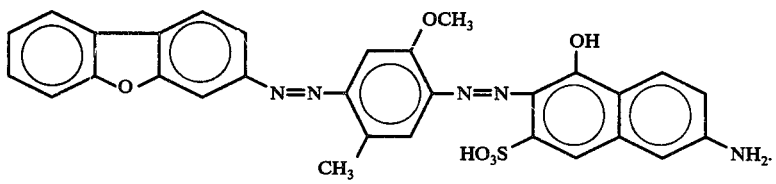

It dyes synthetic polyamide a golden-yellow shade.

EXAMPLE 6

A solution consisting of 13.7 parts of 2-amino-1-methoxy-4-methylbenzene, 100 parts of acetone and 20 parts of water is added dropwise at a temperature of 0°–5° to the diazo solution described in Example 1. The pH is adjusted to 3–4 by the addition of 10 parts of sodium acetate. The whole is stirred for one hour and is then diazotised further by the addition of 20 parts of hydrochloric acid and 7 parts of sodium nitrite in 25 parts of water. This reaction mass is added dropwise to a solution with a pH of 9 consisting of 23.9 parts of 2-amino-5-hydroxynaphthalene-7-sulphonic acid and 200 parts of water, during which time the temperature is kept at between 0° and 5°. The coupling mass is stirred for 2 hours and the precipitated dye is filtered off, washed with an aqueous sodium chloride solution and dried at 80°. In the form of the free acid, the dye has the formula It dyes wool and synthetic polyamides in level, pure yellowish-red shades and the dyeings have good light and wet fastness properties.

EXAMPLE 7

If, in place of the second coupling component described in Example 6, an equivalent quantity of 1-aminonaphthalene-6-sulphonic acid is used and the second coupling reaction is carried out at a pH of 3–4, a dye of the formula (in the form of the free acid) is isolated:

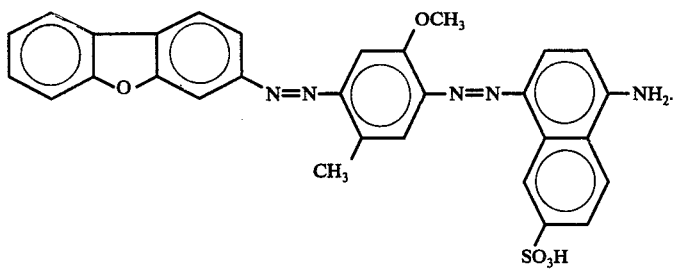

It dyes natural and synthetic polyamides in fast blue shades.

EXAMPLE 8

26.3 Parts of 3-aminodibenzofuran-8-sulphonic acid, prepared as described in Example 3, are suspended in 50 parts of 2N sodium carbonate solution and 50 parts water, after which 7 parts sodium nitrite in 25 parts of water are added. The suspension is added dropwise to 125 parts of 2N hydrochloric acid and 100 parts of ice. To the diazotised compound are added dropwise, at 5°, 14.3 parts α-aminonaphthalene in 12 parts of 30% hydrochloric acid and 200 parts of water. The pH value is adjusted to 2–3 with sodium acetate. On completion of coupling, the aminoazoic dye is salted out by the addition of sodium chloride, filtered and washed with a 20% sodium chloride solution. This dye is then added to 200 parts of water and brought into solution by adjusting the pH to 12 with sodium hydroxide solution. After the addition of 7 parts of sodium nitrite in 25 parts of water, the dye solution is added dropwise to 30 parts of a 30% hydrochloric acid and 350 parts of ice. The whole is then stirred for 3 hours to complete diazotisation. The diazotised dye is added, within one hour, to a solution consisting of 11 parts of m-cresol and 100 parts of water, the pH of which has been previously adjusted to 12 with sodium hydroxide solution. During coupling the pH is kept at 9 by the addition of sodium carbonate. The diazo dye is then salted out at a pH of 7.5 with sodium chloride, it is filtered and washed with a 20% sodium chloride solution. The paste obtained is suspended in 200 parts of water at a pH of 12 and 36 parts of dimethylsulphate are added at 35°. The temperature is increased to 55°–60° and the pH is kept at between 10 and 11 with sodium hydroxide solution. On completion of etherification, the precipitated dye is filtered off, washed with a 20% sodium chloride solution and the presscake is dried in a vacuum at 80°. In the form of the free acid, the dye obtained has the formula

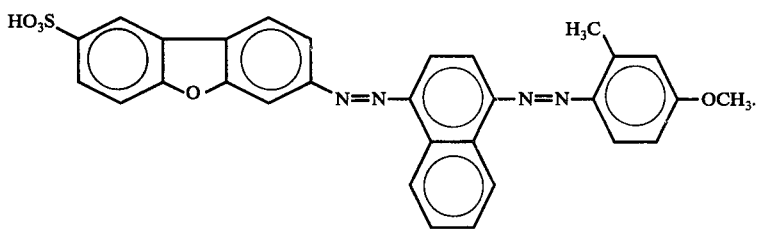

It dyes nylon in fast orange shades and the dyeings have good light and wet fastness properties.

EXAMPLE 9

If the 3-aminodibenzofuran-2-sulphonic acid, prepared as described in Example 5, is used as first component in a similar way to that indicated in Example 8, and the phenolic hydroxyl group is reacted at 70° and at pH of 9 with p-toluenesulfonylchloride instead of dimethylsulphate, a dye is obtained which, in the form of the free acid, has the formula:

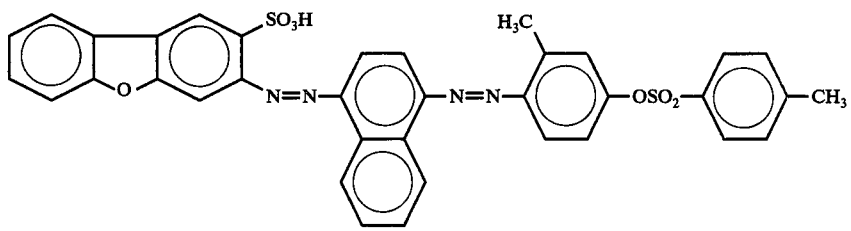

It dyes nylon in orange shades and the dyeings have good fastness properties.

Dyeing Recipe

100 Parts of a wetted-out synthetic polyamide fabric, e.g. nylon, are added at 40° to a dye bath containing 400 parts of water, 10 parts of anhydrous sodium sulphate and 2 parts of the dye from Example 1.

The dye liquor is heated to its boiling point over the course of 30 minutes, kept at this temperature for one hour, 4 parts of glacial acetic acid added and dyeing is completed by further heating to boiling point over 30 minutes.

During dyeing, the water which evaporates is constantly replaced. The golden-yellow dyed nylon is removed from the liquor, rinsed with water and dried.

Wool can also be dyed by the same process. The dyeings have good light and wet fastness properties.

Printing Recipe

Polyamide fabric, such as nylon, silk or wool, is printed with a printing paste of the following composition:

| | |
|---|---|
| 20 parts | of the dye according to Example 1 |
| 60 parts | of thiourea |
| 500 parts | of a 10% flour ether |
| 60 parts | of ammonium tartrate 1:3 |
| 360 parts | of water |
| 1000 parts | |

The printed material is steamed for 40 minutes at 102°–104° and then rinsed cold and hot. After hot soaping at 60°, followed by further cold rinsing and drying, a golden-yellow print with good light and wet fastness properties is obtained.

The following Table Ia shows the structure of other dyes which can be produced as described in Examples 1 and 2 and are of the formula

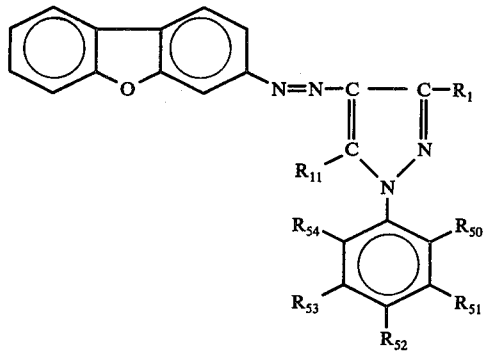

(a), wherein $R_1$, $R_{11}$ and $R_{50}$ to $R_{54}$ are as defined in the Table. A further column I shows the shade of the dyeing on nylon.

Table Ia

| Exp. No. | $R_1$ | $R_{11}$ | $R_{50}$ | $R_{51}$ | $R_{52}$ | $R_{53}$ | $R_{54}$ | I |
|---|---|---|---|---|---|---|---|---|
| 10 | $CH_3$ | OH | $SO_3H$ | H | H | H | H | golden-yellow |
| 11 | " | " | H | $SO_3H$ | H | H | H | " |
| 12 | " | " | H | H | $SO_3H$ | H | H | " |
| 13 | " | " | $SO_3H$ | H | H | $SO_3H$ | H | " |
| 14 | " | " | Cl | H | $SO_3H$ | H | H | " |
| 15 | " | " | Cl | H | H | $SO_3H$ | H | " |
| 16 | " | " | $SO_3H$ | H | Cl | H | H | " |
| 17 | " | " | H | $SO_3H$ | Cl | H | H | " |
| 18 | " | " | Cl | Cl | $SO_3H$ | H | H | " |
| 19 | " | " | Cl | Cl | H | $SO_3H$ | Cl | " |
| 20 | " | " | $CH_3$ | H | $SO_3H$ | H | H | " |
| 21 | " | " | $CH_3$ | H | H | $SO_3H$ | H | " |
| 22 | " | " | H | $SO_3H$ | $CH_3$ | H | H | " |
| 23 | " | " | Cl | H | $SO_3H$ | H | $CH_3$ | " |
| 24 | " | " | H | $CH_3$ | $SO_3H$ | H | $OCH_3$ | " |
| 25 | COOH | " | H | H | $SO_3H$ | H | H | " |
| 26 | " | " | Cl | H | $SO_3H$ | Cl | H | " |
| 27 | " | " | $CH_3$ | H | $SO_3H$ | H | H | " |
| 28 | $COOC_2H_5$ | " | H | H | $SO_3H$ | H | H | " |
| 29 | $CH_3$ | $NH_2$ | $SO_3H$ | H | H | H | H | yellow |
| 30 | " | " | H | $SO_3H$ | H | H | H | " |
| 31 | " | " | H | H | $SO_3H$ | H | H | " |
| 32 | " | " | $SO_3H$ | H | H | $SO_3H$ | H | " |
| 33 | " | " | Cl | H | $SO_3H$ | H | H | " |
| 34 | " | " | Cl | H | H | $SO_3H$ | H | " |
| 35 | " | " | $SO_3H$ | H | Cl | H | H | " |
| 36 | " | " | H | $SO_3H$ | Cl | H | H | " |
| 37 | " | " | Cl | Cl | $SO_3H$ | H | H | " |
| 38 | " | " | Cl | Cl | H | $SO_3H$ | Cl | " |
| 39 | " | " | $CH_3$ | H | $SO_3H$ | H | H | " |
| 40 | " | " | $CH_3$ | H | H | $SO_3H$ | H | " |
| 41 | " | " | H | $SO_3H$ | $CH_3$ | H | H | " |
| 42 | " | " | Cl | H | $SO_3H$ | H | $CH_3$ | " |
| 43 | " | " | H | $CH_3$ | $SO_3H$ | H | $OCH_3$ | " |
| 44 | " | " | Cl | H | $SO_3H$ | Cl | H | " |

The coupling components shown in Table Ia (except Examples 13 and 32) may also be used in the production of dyes in accordance with the description of Examples 3 and 5, and with 3-aminodibenzofuran-2- or -8-sulphonic acid as diazo component.

The coupling components given in the following Table Ib may also be used. The dyes have the formula

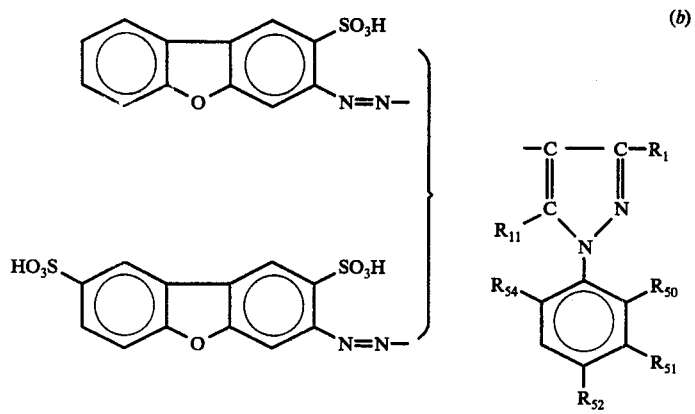

(b)

wherein $R_1$, $R_{11}$, $R_{50}$, $R_{51}$, $R_{52}$ and $R_{54}$ are as defined in the Table. The shade of the dyeing on nylon is shown in column I.

wherein $R_{11}$ and $R_{55}$ to $R_{60}$ are as defined in the Table. A further column I shows the shade of the dyeing on nylon.

Table Ib

| Exp. No. | $R_{11}$ | $R_1$ | $R_{50}$ | $R_{51}$ | $R_{52}$ | $R_{54}$ | I |
|---|---|---|---|---|---|---|---|
| 45 | OH | $CH_3$ | H | H | H | H | golden-yellow |
| 46 | $NH_2$ | $CH_3$ | H | H | H | H | yellow |
| 47 | OH | $CH_3$ | Cl | H | H | H | golden-yellow |
| 48 | OH | $CH_3$ | H | Cl | H | H | " |
| 49 | OH | $CH_3$ | H | H | Cl | H | " |
| 50 | OH | $CH_3$ | H | $CF_3$ | H | H | " |
| 51 | OH | $CH_3$ | H | CN | H | H | " |
| 52 | OH | $CH_3$ | H | $SO_2$—$NH_2$ | H | H | " |
| 53 | OH | $CH_3$ | H | $SO_2NH$—$C_2H_4OH$ | H | H | " |
| 54 | OH | $CH_3$ | H | COOH | OH | H | " |
| 55 | OH | $CH_3$ | Cl | H | H | $CH_3$ | " |
| 56 | $NH_2$ | $CH_3$ | Cl | H | H | H | yellow |
| 57 | $NH_2$ | $CH_3$ | H | Cl | H | H | " |
| 58 | OH | $COOC_2H_5$ | H | H | H | H | golden-yellow |
| 59 | OH | $CONH_2$ | H | H | H | H | " |
| 60 | $NH_2$ | $CH_3$ | H | H | Cl | H | yellow |

The following Table II shows the structure of other dyes which can be produced as described in Examples 1 and 2 and have the formula (c)

The coupling components shown in Table II (except Examples 66 to 68 and 75 to 77) may also be used in the production of dyes in accordance with the description of Examples 3 and 5, and with 3-aminodibenzofuran-2- or -8-sulphonic acid as diazo component.

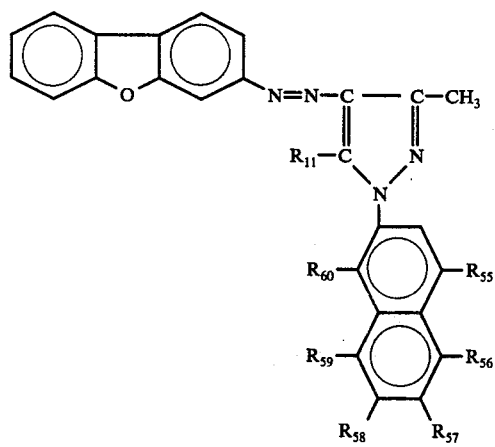

Table II

| Exp. No. | $R_{11}$ | $R_{55}$ | $R_{56}$ | $R_{57}$ | $R_{58}$ | $R_{59}$ | $R_{60}$ | I |
|---|---|---|---|---|---|---|---|---|
| 61 | OH | $SO_3H$ | H | H | H | H | H | golden-yellow |
| 62 | " | H | $SO_3H$ | H | H | H | H | " |
| 63 | " | H | H | $SO_3H$ | H | H | H | " |
| 64 | " | H | H | H | $SO_3H$ | H | H | " |
| 65 | " | H | H | H | H | $SO_3H$ | H | " |
| 66 | " | H | $SO_3H$ | H | H | H | $SO_3H$ | " |
| 67 | " | $SO_3H$ | H | H | H | $SO_3H$ | H | " |

Table II-continued

| Exp. No. | $R_{11}$ | $R_{55}$ | $R_{56}$ | $R_{57}$ | $R_{58}$ | $R_{59}$ | $R_{60}$ | I |
|---|---|---|---|---|---|---|---|---|
| 68 | " | H | H | $SO_3H$ | H | $SO_3H$ | H | " |
| 69 | " | H | H | H | H | H | $SO_3H$ | " |
| 70 | $NH_2$ | $SO_3H$ | H | H | H | H | H | yellow |
| 71 | " | H | $SO_3H$ | H | H | H | H | " |
| 72 | " | H | H | $SO_3H$ | H | H | H | " |
| 73 | " | H | H | H | $SO_3H$ | H | H | " |
| 74 | " | H | H | H | H | $SO_3H$ | H | " |
| 75 | " | H | $SO_3H$ | H | H | H | $SO_3H$ | " |
| 76 | " | $SO_3H$ | H | H | H | $SO_3H$ | H | " |
| 77 | " | H | H | $SO_3H$ | H | $SO_3H$ | H | " |
| 78 | " | H | H | H | H | H | $SO_3H$ | " |

The following Table III shows the structure of other dyes which can be produced as described in Examples 1 and 2 and are of the formula

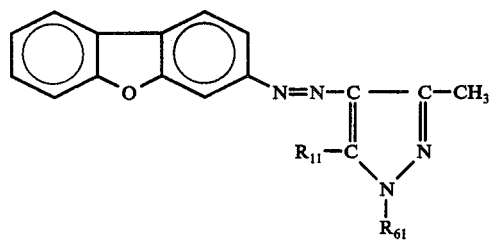

(d)

wherein $R_{11}$ and $R_{61}$ are as defined in the Table. Column I shows the shade of the dyeing on nylon.

The coupling components shown in Table III may also be used in the production of dyes in accordance with the description in Examples 3 and 5 and with 3-aminodibenzo furan-2- or -8-sulphonic acid as the diazo component.

Table III

| Exp. No. | $R_{11}$ | $R_{61}$ | I |
|---|---|---|---|
| 79 | OH | (fluorene with $HO_3S$) | golden-yellow |
| 80 | $NH_2$ | (fluorene with $HO_3S$) | yellow |
| 81 | OH | (dibenzofuran with $HO_3S$) | golden-yellow |
| 82 | $NH_2$ | (dibenzofuran with $HO_3S$) | yellow |
| 83 | OH | (tetrahydronaphthalene with $SO_3H$) | golden yellow |
| 84 | $NH_2$ | (tetrahydronaphthalene with $SO_3H$) | yellow |

The following Table IV shows the structure of other dyes which can be produced as described in Examples 1 and 2 or 3 and 5 and are of the formula

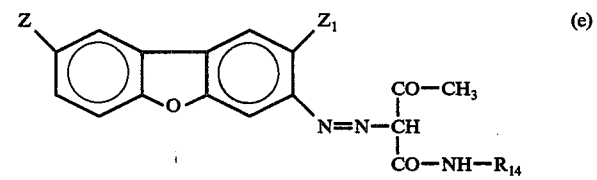

(e)

wherein Z, $Z_1$ and $R_{14}$ are as defined in the Table. Column I shows the shade of the dyeing on nylon.

Table IV

| Exp. No. | Z | $Z_1$ | $R_{14}$ | I |
|---|---|---|---|---|
| 85 | H | H | (naphthalene-disulphonic) | greenish-yellow |
| 86 | H | H | (naphthalene-sulphonic) | " |
| 87 | $SO_3H$ | H | " | " |
| 88 | H | $SO_3H$ | " | " |
| 89 | H | H | (phenyl-$SO_3H$) | " |
| 90 | $SO_3H$ | H | " | " |
| 91 | H | $SO_3H$ | " | " |

Table IV-continued

| Exp. No. | Z | $Z_1$ | $R_{14}$ | I |
|---|---|---|---|---|
| 92 | $SO_3H$ | H | –C₆H₅ | " |
| 93 | H | $SO_3H$ | " | " |
| 94 | $SO_3H$ | H | –C₆H₄–CH₃ | " |
| 95 | H | $SO_3H$ | " | " |
| 96 | $SO_3H$ | H | –C₆H₄–OCH₃ | " |
| 97 | H | $SO_3H$ | " | " |
| 98 | $SO_3H$ | H | –C₆H₄–OC₂H₅ | " |
| 99 | H | $SO_3H$ | " | " |
| 100 | $SO_3H$ | H | –C₆H₃(OCH₃)₂ | " |
| 101 | H | $SO_3H$ | " | " |
| 102 | $SO_3H$ | H | –C₆H₃(OC₂H₅)₂ | " |
| 103 | H | $SO_3H$ | " | " |

The following Table V shows the structure of other dyes which can be produced as described in Example 6, first coupling reaction, and which have the formula

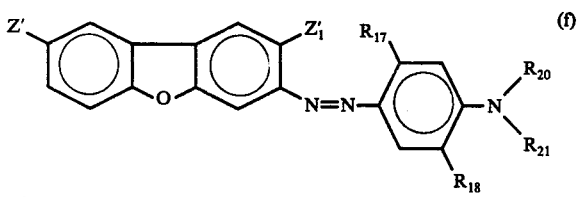

(f)

wherein either $Z'$ or $Z_1'$ is -$SO_3H$ and the radicals $R_{17}$, $R_{18}$, $R_{20}$ and $R_{21}$ are as defined in the Table. A further column I shows the shade of the dyeing on nylon.

Each coupling component given in the Table, by way of example, may be coupled with the 3-aminodibenzofuran-2- and -8-sulphonic acid, the component given in Example 104 may also be coupled with the 3-aminodibenzofuran.

Table V

| Exp. No. | $R_{17}$ | $R_{18}$ | $R_{20}$ | $R_{21}$ | I |
|---|---|---|---|---|---|
| 104 | H | H | $SO_3H$ –CH₂–C₆H₅ | $C_2H_5$ | golden-yellow |
| 105 | $CH_3$ | H | –CH₂–C₆H₅ | $C_2H_5$ | " |
| 106 | H | H | $CH_3$ | $CH_3$ | " |
| 107 | H | H | $C_2H_5$ | $C_2H_5$ | " |
| 108 | H | H | n-$C_4H_9$ | n-$C_4H_9$ | " |
| 109 | $CH_3$ | H | n-$C_4H_9$ | n-$C_4H_9$ | " |
| 110 | H | H | –$C_2H_4CN$ | –$C_2H_4CN$ | " |
| 111 | H | H | –$C_2H_4Cl$ | –$C_2H_4Cl$ | " |
| 112 | H | H | –$C_2H_4OH$ | –$C_2H_4OH$ | " |
| 113 | $CH_3$ | H | –$C_2H_4OH$ | –$C_2H_4OH$ | " |
| 114 | H | $CH_3$ | H | H | " |
| 115 | H | $OCH_3$ | H | H | " |
| 116 | $OCH_3$ | H | H | H | " |
| 117 | $OCH_3$ | $OCH_3$ | H | H | " |
| 118 | H | H | i-$C_3H_7$ | H | " |
| 119 | $OCH_3$ | H | –CH₂–C₆H₅ | $C_2H_5$ | " |

The following Table VI shows the structure of other dyes which can be produced as described in Examples 1 and 2 and have the formula

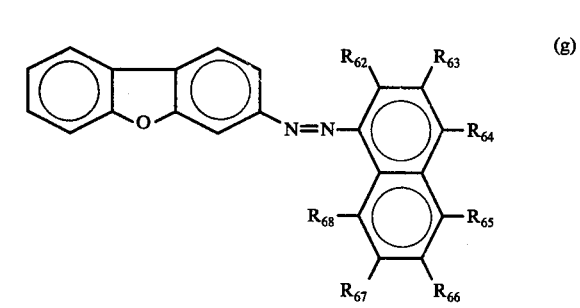

(g)

wherein $R_{62}$ to $R_{68}$ are as defined in the Table. A further column I shows the shade of the dyeing on nylon.

The coupling arrangement shown in Table VI (except Examples 124, 125 and 127 to 129) may also be used in the production of dyes in accordance with the description in Examples 3 and 5 and with 3-aminodibenzofuran-2- or -8-sulphonic acid as the diazo component.

Table VI

| Exp. No. | $R_{62}$ | $R_{63}$ | $R_{64}$ | $R_{65}$ | $R_{66}$ | $R_{67}$ | $R_{68}$ | I |
|---|---|---|---|---|---|---|---|---|
| 120 | OH | H | $SO_3H$ | H | H | H | H | red |
| 121 | OH | H | H | H | $SO_3H$ | H | H | " |
| 122 | OH | H | H | H | H | $SO_3H$ | H | " |
| 123 | OH | H | H | H | H | H | $SO_3H$ | " |
| 124 | OH | $SO_3H$ | H | H | $SO_3H$ | H | H | " |
| 125 | OH | H | H | H | $SO_3H$ | H | $SO_3H$ | scarlet |
| 126 | $NH_2$ | H | H | H | $SO_3H$ | H | H | orange |
| 127 | $NH_2$ | H | $SO_3H$ | H | H | H | $SO_3H$ | " |
| 128 | $NH_2$ | H | H | $SO_3H$ | H | $SO_3H$ | H | " |
| 129 | $NH_2$ | H | H | H | $SO_3H$ | H | $SO_3H$ | " |

Table VI-continued

| Exp. No. | R$_{62}$ | R$_{63}$ | R$_{64}$ | R$_{65}$ | R$_{66}$ | R$_{67}$ | R$_{68}$ | I |
|---|---|---|---|---|---|---|---|---|
| 130 | NH—C$_6$H$_4$—SO$_3$H | H | H | H | H | H | H | scarlet |
| 131 | NH—C$_6$H$_5$ | H | H | H | H | H | SO$_3$H | " |
| 132 | NH—C$_6$H$_4$—CH$_3$ | H | H | H | H | H | SO$_3$H | " |
| 133 | NH$_2$ | H | H | H | SO$_3$H | H | OH | red |
| 134 | NH—CH$_3$ | H | H | H | SO$_3$H | H | OH | " |
| 135 | NH—C$_2$H$_5$ | H | H | H | SO$_3$H | H | OH | " |
| 136 | NH—C$_3$H$_7$ | H | H | H | SO$_3$H | H | OH | " |
| 137 | NH—C$_6$H$_{11}$ | H | H | H | SO$_3$H | H | OH | " |
| 138 | NH—C$_6$H$_5$ | H | H | H | SO$_3$H | H | OH | " |
| 139 | NH—C$_6$H$_8$(CH$_3$)$_3$ | H | H | H | SO$_3$H | H | OH | " |
| 140 | NH—C$_6$H$_8$(CH$_3$)$_3$ | H | H | H | SO$_3$H | H | OH | " |
| 141 | H | H | NH$_2$ | H | H | H | SO$_3$H | orange |
| 142 | H | H | NH$_2$ | H | SO$_3$H | H | H | " |
| 143 | H | H | NH$_2$ | H | H | SO$_3$H | H | " |
| 144 | NH—C$_6$H$_4$—OCH$_3$ | H | H | H | SO$_3$H | H | OH | red |
| 145 | NH—C$_6$H$_3$(OCH$_3$)$_2$ | H | H | H | SO$_3$H | H | H | " |
| 146 | NH—C$_6$H$_3$(CH$_3$)$_2$ | H | H | H | SO$_3$H | H | OH | violet |

The following Table VII shows the structure of other dyes which can be produced as described in Examples 1 and 2 and have the formula

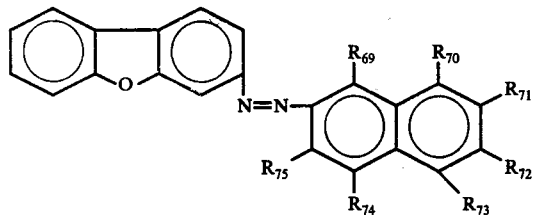

(h)

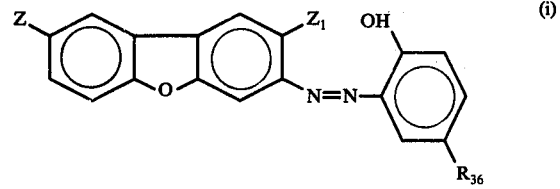

(i)

wherein $R_{69}$ and $R_{75}$ are as defined in the Table. A further column I shows the shade of the dyeing on nylon.

Providing they contain only one -$SO_3H$ group the coupling components given in Table VII can be used to produce dyes by coupling them with 3-aminodibenzofuran-2- or -8-sulphonic acid.

wherein Z and $Z_1$ and also $R_{36}$ are as defined in the Table. A further column I shows the shade of the dyeing on nylon.

Table VII

| Exp. No. | $R_{69}$ | $R_{70}$ | $R_{71}$ | $R_{72}$ | $R_{73}$ | $R_{74}$ | $R_{75}$ | I |
|---|---|---|---|---|---|---|---|---|
| 147 | OH | $NH_2$ | $SO_3H$ | H | $SO_3H$ | H | H | violet |
| 148 | OH | $NH_2$ | H | $SO_3H$ | H | H | $SO_3H$ | " |
| 149 | OH | $NH_2$ | H | H | $SO_3H$ | H | $SO_3H$ | " |
| 150 | OH | H | H | H | $NH_2$ | H | $SO_3H$ | orange |
| 151 | OH | H | H | $NH_2$ | H | H | $SO_3H$ | " |
| 152 | OH | H | $NH_2$ | H | H | H | $SO_3H$ | red |
| 153 | OH | H | $NH_2$ | $SO_3H$ | H | H | $SO_3H$ | violet |
| 154 | OH | NH—CO—$CH_3$ | H | $SO_3H$ | H | H | $SO_3H$ | " |
| 155 | OH | " | H | H | $SO_3H$ | H | $SO_3H$ | " |
| 156 | OH | " | H | H | H | $SO_3H$ | H | " |
| 157 | OH | " | H | $SO_3H$ | H | H | $SO_3H$ | " |
| 158 | OH | H | NH—CO—$CH_3$ | H | H | H | $SO_3H$ | red |
| 159 | OH | H | 2,6-dimethylphenyl-NH | H | H | H | $SO_3H$ | red |
| 160 | OH | H | H | NH—CO—$CH_3$ | H | H | $SO_3H$ | orange |
| 161 | OH | H | NH—CO—$CH_3$ | $SO_3H$ | H | H | $SO_3H$ | red |
| 162 | OH | H | NH—CO—$CH_3$ | $SO_3H$ | $SO_3H$ | H | H | red |
| 163 | OH | H | H | NH—$CH_3$ | H | H | $SO_3H$ | red |
| 164 | OH | H | H | NH—phenyl | H | H | $SO_3H$ | red |
| 165 | OH | H | H | NH—CO—$CH_3$ | H | H | $SO_3H$ | red |
| 166 | OH | H | H | $SO_3H$ | H | H | $SO_3H$ | violet |
| 167 | OH | H | NH—CO—phenyl | H | H | $SO_3H$ | H | red |
| 168 | OH | H | H | $SO_3H$ | H | H | $SO_3H$ | red |
| 169 | OH | H | H | $SO_3H$ | H | $SO_3H$ | H | red |
| 170 | OH | $SO_3H$ | H | H | H | H | $SO_3H$ | red |
| 171 | $NH_2$ | H | H | H | H | $SO_3H$ | H | scarlet |
| 172 | OH | H | H | H | H | H | $SO_3H$ | red |
| 173 | OH | H | NH—$SO_2$—phenyl | H | H | $SO_3H$ | H | violet |
| 174 | OH | NH—O—CO—phenyl | H | $SO_3H$ | H | H | $SO_3H$ | " |

The following Table VIII shows the structure of other dyes which can be produced as described in Examples 1, 3 and 5 and have the formula Table VIII

| Exp. No. | Z | $Z_1$ | $R_{36}$ | I |
|---|---|---|---|---|
| 175 | H | $SO_3H$ | $C(CH_3)_3$ | golden-yellow |
| 176 | $SO_3H$ | H | $CH_3$ | " |
| 177 | H | $SO_3H$ | $CH_3$ | " |
| 178 | $SO_3H$ | H | $OCH_3$ | " |
| 179 | H | $SO_3H$ | $OC_2H_5$ | " |
| 180 | $SO_3H$ | H | isooctyl | " |
| 181 | H | $SO_3H$ | isooctyl | " |

Table VIII-continued

| Exp. No. | Z | Z₁ | R₃₆ | I |
|---|---|---|---|---|
| 182 | H | H | 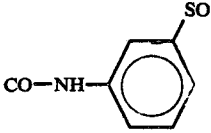 | " |
| 183 | SO₃H | H | " | " |
| 184 | H | SO₃H | " | " |
| 185 | SO₃H | H | 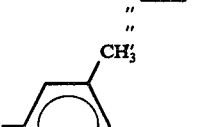 | " |
| 186 | H | SO₃H | " | " |

The following Table IX shows the structure of other dyes which can be produced as described in Examples 1 and 2 and have the formula

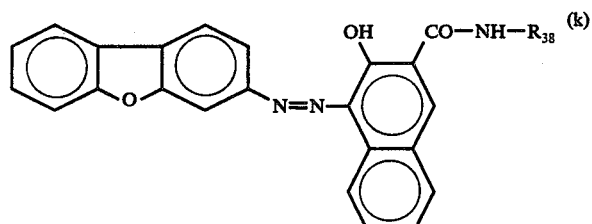
(k)

wherein $R_{38}$ and $R_9$ are as defined in the Table. A further column I shows the shade of the dyeing on nylon.

The coupling components shown in Table IX can also be coupled with 3-aminodibenzofuran-2- or -8-sulphonic acid to produce the corresponding dyes.

Table IX

| Exp. No. | R₃₈ | R₉ | I |
|---|---|---|---|
| 187 | 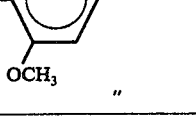 (CF₃) | SO₃H | scarlet |
| 188 | 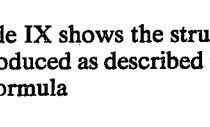 (SO₃H) | H | " |

Table IX-continued

| Exp. No. | R₃₈ | R₉ | I |
|---|---|---|---|
| 189 | 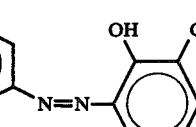 (OCH₃) | SO₃H | " |
| 190 |  (OCH₃, CH₃) | SO₃H | " |
| 191 | 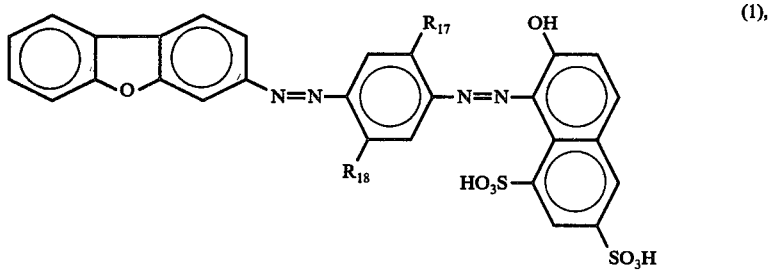 (phenyl) | SO₃H | " |
| 192 | 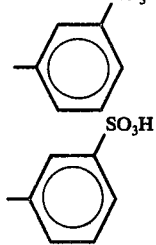 (Cl) | SO₃H | " |

The following Table X shows the structure of other dyes which can be produced as described in Examples 6 and have the formula

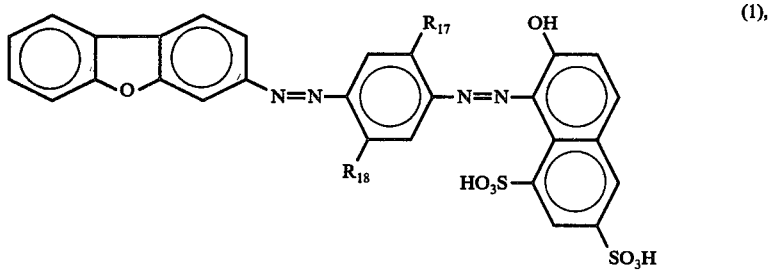
(1), wherein $R_{17}$ and $R_{18}$ are as defined in the Table. A further column I shows the shade of the dyeing on nylon.

Where $R_{17}$ and $R_{18}$ signify hydrogen or methyl, as in Examples 193, 197 and 198, production of the dyestuffs analogous to Example 6 is modified in that the aniline component used for the first coupling is activated using a ω-methanesulphonic acid radical. After coupling this radical is removed by saponification. The second coupling reaction is carried out analogous to Example 6.

Table X

| Exp. No. | R₁₇ | R₁₈ | I |
|---|---|---|---|
| 193 | H | H | orange-red |
| 194 | OCH₃ | H | red |
| 195 | H | OCH₃ | " |
| 196 | H | OC₂H₅ | " |
| 197 | CH₃ | H | " |
| 198 | CH₃ | CH₃ | " |
| 199 | Cl | H | " |
| 200 | H | NH—CO—CH₃ | " |
| 201 | OCH₃ | CH₃ | " |
| 202 | OC₂H₅ | CH₃ | " |
| 203 | OCH₃ | OCH₃ | " |

The following Table XIa shows the structure of other dyes which can be produced as described in Examples 8 and 9 and have the formula

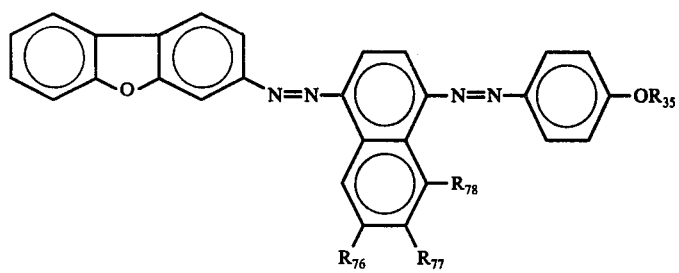

(m)

wherein $R_{35}$ and $R_{76}$ are as defined in the Table. A further column I shows the shade of the dyeing on nylon.

Table XIa

| Exp. No. | $R_{35}$ | $R_{76}$ | $R_{77}$ | $R_{78}$ | I |
|---|---|---|---|---|---|
| 204 | $CH_3$ | $SO_3H$ | H | H | orange |
| 205 | $C_2H_5$ | $SO_3H$ | H | H | " |
| 206 | $SO_2$—⌬ | $SO_3H$ | H | H | " |
| 207 | $SO_2$—⌬—$CH_3$ | $SO_3H$ | H | H | " |
| 208 | $CH_3$ | H | $SO_3H$ | H | " |
| 209 | $SO_2$—⌬ | H | $SO_3H$ | H | " |
| 210 | $SO_2$—⌬—$CH_3$ | H | $SO_3H$ | H | " |
| 211 | $CH_3$ | H | H | $SO_3H$ | " |
| 212 | $SO_2$—⌬ | H | H | $SO_3H$ | " |
| 213 | $SO_2$—⌬—$CH_3$ | H | H | $SO_3H$ | " |

All the coupling components given in Table XIa may also be used in the production of disazoic dyes with 3-amino-dibenzofuran-2- or -8-sulphonic acid in accordance with Examples 8 and 9.

The coupling components shown in the following Table XIb may also be used.

The dyes have the formula

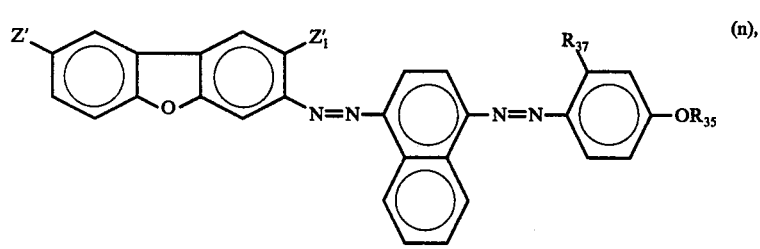

(n), wherein $Z'$, $Z_1'$, $R_{35}$ and $R_{37}$ are as defined in the Table. Column I shows the shade of the dyeing on nylon.

Table XIb

| Exp. No. | $Z'$ | $Z_1'$ | $R_{35}$ | $R_{37}$ | I |
|---|---|---|---|---|---|
| 214 | H | $SO_3H$ | $CH_3$ | $CH_3$ | orange |
| 215 | $SO_3H$ | H | $CH_3$ | $OCH_3$ | " |
| 216 | H | $SO_3H$ | $CH_3$ | $OCH_3$ | " |
| 217 | $SO_3H$ | H | $C_2H_5$ | $CH_3$ | " |
| 218 | H | $SO_3H$ | $C_2H_5$ | $CH_3$ | " |
| 219 | $SO_3H$ | H | $C_2H_5$ | H | " |
| 220 | H | $SO_3H$ | $C_2H_5$ | H | " |
| 221 | $SO_3H$ | H | $SO_2$—⌬—$CH_3$ | $CH_3$ | " |
| 222 | $SO_3H$ | H | " | $OCH_3$ | " |
| 223 | H | $SO_3H$ | " | $OCH_3$ | " |
| 224 | $SO_3H$ | H | " | $OC_2H_5$ | " |
| 225 | H | $SO_3H$ | " | $OC_2H_5$ | " |

The following Table XII shows the structure of other dyes which can be produced as described in Examples 3 and 5 or 8 and 9 and which have the formula

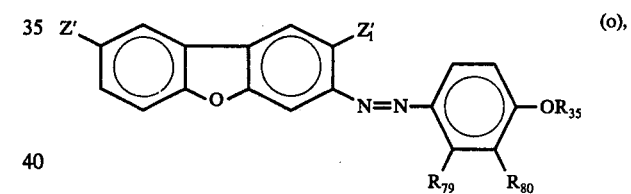

(o), wherein $Z'$, $Z_1'$, $R_{35}$, $R_{79}$ and $R_{80}$ are as defined in the Table. The shade obtained with these dyes on nylon is yellow Table XII

| Exp. No. | $Z'$ | $Z_1'$ | $R_{35}$ | $R_{79}$ | $R_{80}$ |
|---|---|---|---|---|---|
| 226 | H | $SO_3H$ | $CH_3$ | H | H |
| 227 | $SO_3H$ | H | $CH_3$ | H | H |
| 228 | $SO_3H$ | H | $CH_3$ | $CH_3$ | H |
| 229 | H | $SO_3H$ | $CH_3$ | $CH_3$ | H |
| 230 | H | $SO_3H$ | $CH_3$ | $OCH_3$ | H |
| 231 | $SO_3H$ | H | $CH_3$ | $OCH_3$ | H |
| 232 | H | $SO_3H$ | " | H | H |

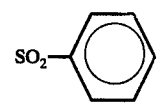

Table XII-continued

| Exp. No. | Z' | Z'₁ | R₃₅ | R₇₉ | R₈₀ |
|---|---|---|---|---|---|
| 233 | SO₃H | H | 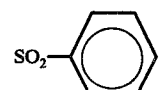 | H | H |
| 234 | H | SO₃H |  | H | H |
| 235 | SO₃H | H |  | H | H |
| 236 | H | SO₃H | CH₃ | H | OCH₃ |
| 237 | SO₃H | H | CH₃ | H | OCH₃ |

What is claimed is:

1. A compound of the formula

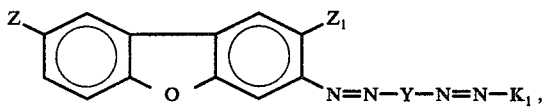

or a salt thereof, wherein each of

Z and Z₁ is independently hydrogen or sulfo, with the proviso that at least one of Z and Z₁ is hydrogen, Y is 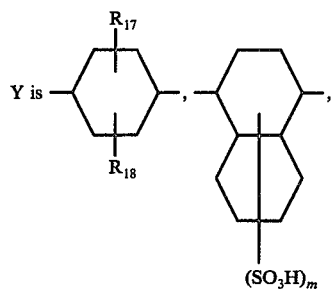

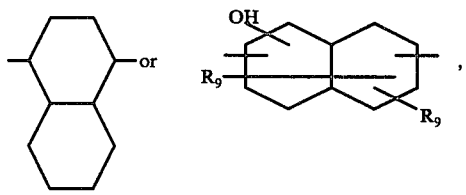

wherein each $R_9$ is independently hydrogen or sulfo, $R_{17}$ is hydrogen, halo, $C_{1-4}$alkyl or $C_{1-4}$alkoxy, $R_{18}$ is hydrogen, $C_{1-4}$alkyl, $C_{1-4}$alkoxy, —NH—CO—NHR₂₂ or —NH—CO—R₂₂', wherein $R_{22}$ is hydrogen, $C_{1-4}$alkyl or phenyl, and $R_{22}'$ is $C_{1-4}$-alkyl or phenyl, and is hydrogen, Y is 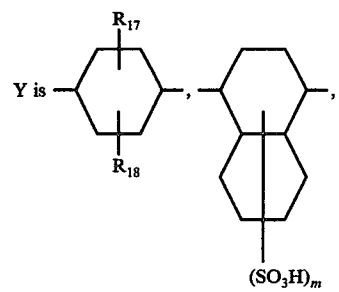

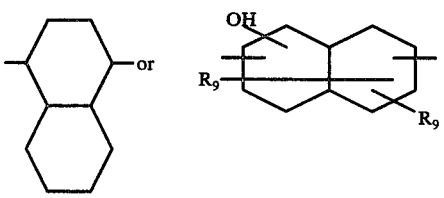

wherein each $R_9$ is independently hydrogen or sulfo, $R_{17}$ is hydrogen, halo, $C_{1-4}$alkyl or $C_{1-4}$alkoxy, $R_{18}$ is hydrogen, $C_{1-4}$alkyl, $C_{1-4}$alkoxy, —NH—CO—NHR₂₂ or —NH—CO—R₂₂', wherein $R_{22}$ is hydrogen, $C_{1-4}$alkyl or phenyl, and $R_{22}'$ is $C_{1-4}$-alkyl or phenyl, and $m$ is 0, 1 or 2, with the proviso that when Y is

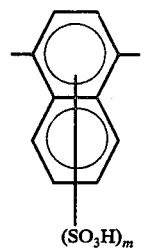

wherein $m$ is 1, the sulfo group is not in the 3- or 5-position relative to the —N=N—K₁ group, and K₁ is

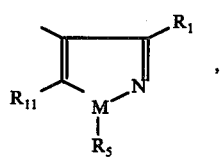

wherein $R_1$ is hydrogen, $C_{1-4}$alkyl, phenyl or —CO—R₂, wherein $R_2$ is hydroxy, —OR₃ or —NHR₄, wherein $R_3$ is $C_{1-4}$-alkyl, and $R_4$ is hydrogen, $C_{1-4}$alkyl or phenyl, $R_5$ is hydrogen,

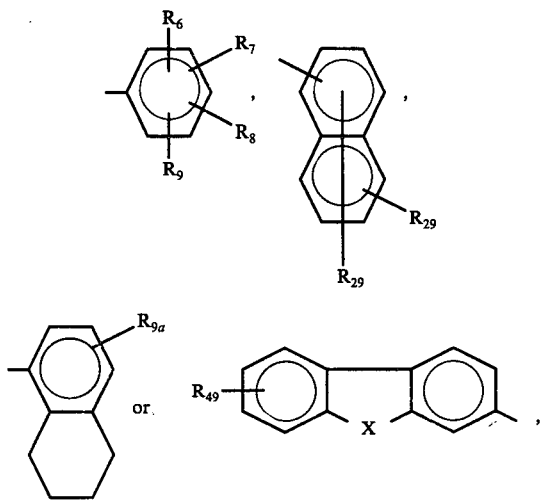

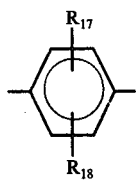

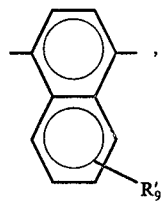

wherein
R$_6$ is hydrogen, halo, C$_{1-4}$alkyl, C$_{1-4}$alkoxy, cyano, trifluoromethyl, hydroxy or —SO$_2$NR$_{10}$R$_{10}'$,
wherein
R$_{10}$ is hydrogen, C$_{1-4}$alkyl, C$_{1-4}$-hydroxyalkyl or phenyl, and
R$_{10}'$ is hydrogen or C$_{1-4}$alkyl,
R$_7$ is hydrogen, halo, C$_{1-4}$alkyl, C$_{1-4}$alkoxy, sulfo or carboxy,
R$_8$ is hydrogen, halo or C$_{1-4}$alkyl,
R$_9$ is hydrogen or sulfo,
R$_{9a}$ is hydrogen or sulfo,
each
R$_{29}$ is independently hydrogen or sulfo,
R$_{49}$ is hydrogen or sulfo, and X is —CH$_2$— or —O—, and
R$_{11}$ is hydroxy or —NHR$_{12}$,
wherein
R$_{12}$ is hydrogen or —SO$_2$R$_{13}$,
wherein
R$_{13}$ is C$_{1-4}$alkyl, phenyl or phenyl substituted by 1 to 3 C$_{1-4}$alkyls,
with the proviso that the molecule contains 1 or 2 sulfo groups.

2. A compound according to claim 1, or a sodium, potassium or N⊕RaRbRcRd salt thereof,
wherein each of Ra, Rb, Rc and Rd is independently hydrogen, C$_{1-3}$alkyl or C$_{2-4}$hydroxyalkyl the hydroxy group of which is not bound to the carbon atom attached to the nitrogen atom, with the proviso that at least one of Ra, Rb, Rc and Rd is hydrogen when any of Ra, Rb, Rc and Rd is C$_{2-4}$hydroxyalkyl.

3. A compound according to claim 1, or a salt thereof, wherein
R$_1$ is C$_{1-4}$alkyl,
R$_6$ is hydrogen, chloro, methyl, methoxy, cyano, trifluoromethyl or —SO$_2$NHR$_{10}''$, wherein R$_{10}''$ is hydrogen or 2-hydroxyethyl, and
R$_7$ is hydrogen, chloro, methyl, methoxy or sulfo,
R$_8$ is hydrogen or chloro,
R$_9$ is hydrogen,
R$_{9a}$ is 4-sulfo,
R$_{11}$ is hydroxy or amino,
R$_{17}$ is hydrogen, chloro, methyl, methoxy or ethoxy,
R$_{18}$ is hydrogen, methyl, methoxy or ethoxy, and
each
R$_{29}$ is independently hydrogen or sulfo, with the proviso that at least one R$_{29}$ is sulfo.

4. A compound according to claim 3, or a salt thereof, wherein
Y is

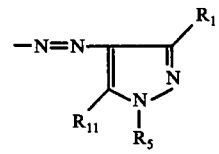

wherein
R$_9'$ is hydrogen or sulfo, with the proviso that when R$_9$ is sulfo it is in the 6-, 7- or 8-position relative to the

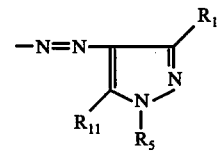

group,
R$_{17}$ is hydrogen, chloro, methyl, methoxy or ethoxy, and
R$_{18}$ is hydrogen, methyl, methoxy or ethoxy, with the proviso that when one of R$_{17}$ and R$_{18}$ is hydrogen and the other is other than hydrogen, the one that is other than hydrogen is meta to the

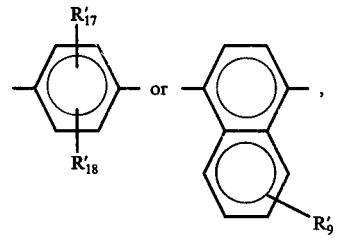

group and when both
R$_{17}$ and R$_{18}$ are other than hydrogen,
R$_{17}$ and R$_{18}$ are para to each other.

5. A compound according to claim 1, or a salt thereof, wherein
Y is

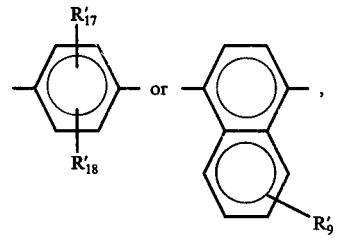

wherein
R$_9'$ is hydrogen or sulfo, with the proviso that when R$_9'$ is sulfo it is in the 6-, 7- or 8-position relative to the —N=N—K$_1$ group,
R$_{17}'$ is hydrogen, chloro, methyl, methoxy or ethoxy, and
R$_{18}'$ is hydrogen, methyl, methoxy or ethoxy, and $K_1$ is

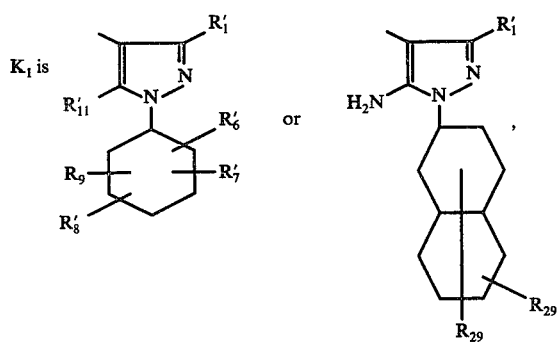 or 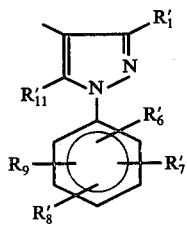, wherein
$R_1'$ is $C_{1-4}$alkyl,
$R_6'$ is hydrogen, chloro, methyl, methoxy, cyano or $-SO_2NR_{10}R_{10}'$,
wherein
$R_{10}$ is hydrogen, $C_{1-4}$alkyl, $C_{1-4}$hydroxyalkyl or phenyl, and
$R_{10}'$ is hydrogen or $C_{1-4}$-alkyl,
$R_7'$ is hydrogen, chloro, methyl, methoxy or sulfo,
wherein
$R_9'$ is hydrogen or sulfo, with the proviso that when $R_9'$ is sulfo it is in the 6-, 7- or 8-position relative to the $-N=N-K_1$ group,
$R_{17}'$ is hydrogen, chloro, methyl, methoxy or ethoxy, and
$R_{18}'$ is hydrogen, methyl, methoxy or ethoxy, and $K_1$ is

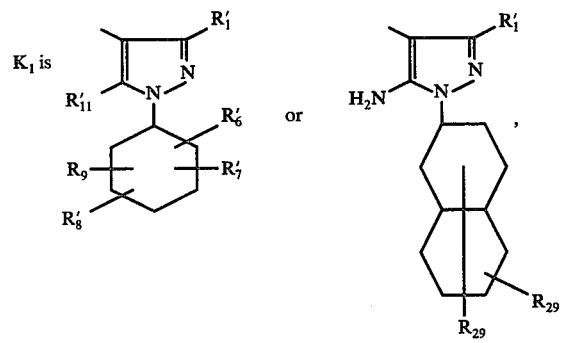 or 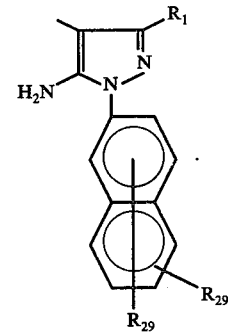, wherein
$R_1'$ is $C_{1-4}$alkyl,
$R_6'$ is hydrogen, chloro, methyl, methoxy, cyano or $-SO_2NR_{10}R_{10}'$,
wherein
$R_{10}$ is hydrogen, $C_{1-4}$alkyl, $C_{1-4}$hydroxyalkyl or phenyl, and
$R_{10}'$ is hydrogen or $C_{1-4}$alkyl,
$R_7'$ is hydrogen, chloro, methyl, methoxy or sulfo,
$R_8'$ is hydrogen, chloro or methyl,
$R_9$ is hydrogen or sulfo,
$R_{11}'$ is hydroxy or amino, and
each
$R_{29}$ is independently hydrogen or sulfo.

6. A compound according to claim 5, or a salt thereof, wherein
$K_1$ is

7. A compound according to claim 6, or a salt thereof, wherein
$R_{17}'$ is hydrogen, chloro, methyl or methoxy.

8. A compound according to claim 7, or a salt thereof, wherein
$R_1'$ is methyl,
$R_6'$ is hydrogen, chloro, methyl or methoxy,
$R_7'$ is hydrogen, chloro or sulfo,
$R_8'$ is hydrogen or chloro,
$R_{17}'$ is hydrogen, methyl or methoxy, and
$R_{18}'$ is methyl or methoxy, with the proviso that $R_{18}'$ is meta to the $-N=N-K_1''$ group and $R_{17}'$ is para to $R_{18}'$.

9. A compound according to claim 8, or a salt thereof, wherein
$R_6'$ is hydrogen or chloro,
$R_7'$ is hydrogen or sulfo,
$R_8'$ is hydrogen,
$R_9$ is hydrogen, and
$R_9'$ is hydrogen.

10. A compound according to claim 5, or a salt thereof,
wherein
$K_1$ is

11. A compound according to claim 10, or a salt thereof,
wherein
$R_{17}'$ is hydrogen, chloro, methyl or methoxy.

12. A compound according to claim 11, or a salt thereof,
wherein
$R_1'$ is methyl,
$R_{17}'$ is hydrogen, methyl or methoxy,
$R_{18}'$ is methyl or methoxy, with the proviso that $R_{18}'$ is meta to the $-N=N-K_1$ group and $R_{17}'$ is para to $R_{18}'$, and
each
$R_{29}$ is independently hydrogen or sulfo, with the proviso that at least one $R_{29}$ is sulfo.

13. A compound according to claim 12, or a salt thereof,
wherein
$R_9'$ is hydrogen.

* * * * *